(12) United States Patent
Liktor et al.

(10) Patent No.: US 10,242,493 B2
(45) Date of Patent: Mar. 26, 2019

(54) METHOD AND APPARATUS FOR FILTERED COARSE PIXEL SHADING

(71) Applicant: INTEL CORPORATION, Santa Clara, CA (US)

(72) Inventors: Gabor Liktor, Karlsruhe (DE); Marco Salvi, San Francisco, CA (US); Karthik Vaidyanathan, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/319,130

(22) Filed: Jun. 30, 2014

(65) Prior Publication Data

US 2015/0379763 A1     Dec. 31, 2015

(51) Int. Cl.

| | |
|---|---|
| *G06T 15/00* | (2011.01) |
| *G06T 15/04* | (2011.01) |
| *G06T 15/80* | (2011.01) |
| *G06T 1/20* | (2006.01) |

(52) U.S. Cl.
CPC ............... *G06T 15/80* (2013.01); *G06T 1/20* (2013.01); *G06T 15/005* (2013.01); *G06T 15/04* (2013.01)

(58) Field of Classification Search
CPC ......... G06T 15/80; G06T 15/005; G06T 1/20; G06T 15/04
See application file for complete search history.

(56) References Cited

U.S. PATENT DOCUMENTS

| | | | |
|---|---|---|---|
| 5,579,456 A | 11/1996 | Cosman | |
| 5,949,424 A | 9/1999 | Cabral et al. | |
| 6,509,902 B1 | 1/2003 | Pfister et al. | |
| 8,243,069 B1* | 8/2012 | French | G06T 15/40 345/421 |
| 2002/0171644 A1 | 11/2002 | Reshetov et al. | |
| 2003/0016218 A1* | 1/2003 | Zwicker | G06T 15/04 345/424 |
| 2004/0012603 A1* | 1/2004 | Pfister | G06T 15/08 345/582 |

(Continued)

FOREIGN PATENT DOCUMENTS

| | | |
|---|---|---|
| JP | 2004164593 A | 6/2004 |
| JP | 2009543195 A | 12/2009 |

(Continued)

OTHER PUBLICATIONS

Fünfzig (Fünfzig, et al., "PNG1 Triangles for Tangent Plane Continuous Surfaces on the GPU", Proceeding GI '08 Proceedings of Graphics Interface 2008, pp. 219-226).*

(Continued)

*Primary Examiner* — William A Beutel
(74) *Attorney, Agent, or Firm* — Nicholson De Vos Webster & Elliott LLP

(57) ABSTRACT

An apparatus and method for performing coarse pixel shading (CPS). For example, one embodiment of a method comprises: A method for coarse pixel shading (CPS) comprising: pre-processing a graphics mesh by creating a tangent-plane parameterization of desired vertex attributes for each vertex of the mesh; and performing rasterization of the mesh in a rasterization stage of a graphics pipeline using the tangent-plane parameterization.

21 Claims, 16 Drawing Sheets

(56) References Cited

U.S. PATENT DOCUMENTS

| | | | |
|---|---|---|---|
| 2004/0183451 A1* | 9/2004 | D'Amora | G06T 15/50 315/100 |
| 2007/0002043 A1 | 1/2007 | Guenter et al. | |
| 2007/0103466 A1 | 5/2007 | Herken et al. | |
| 2009/0213119 A1* | 8/2009 | Oh | G06T 17/20 345/423 |
| 2010/0277571 A1 | 11/2010 | Xu et al. | |
| 2010/0289823 A1 | 11/2010 | Ahn et al. | |
| 2011/0080406 A1 | 4/2011 | Hakura et al. | |
| 2013/0093766 A1* | 4/2013 | Hutchins | G06T 15/005 345/419 |
| 2013/0342535 A1 | 12/2013 | Sylvan et al. | |
| 2014/0139525 A1* | 5/2014 | Grenfell | G06T 17/20 345/423 |
| 2015/0205757 A1* | 7/2015 | Dally | G06F 8/437 708/200 |

FOREIGN PATENT DOCUMENTS

| | | |
|---|---|---|
| WO | 2007005537 A2 | 1/2007 |
| WO | 2013101150 A1 | 7/2013 |

OTHER PUBLICATIONS

International Search Report and the Written Opinion for Application No. PCT/US2015/037874, dated Sep. 25, 2015, 9 pages.

International Preliminary Report on Patentability for Application No. PCT/US2015/037874, dated Jan. 12, 2017, 8 pages.

Donnelly W., "Per-pixel displacement mapping with distance functions," GPU Gems, Chapter 8, vol. 2, 2005, 15 pages.

Notice of Final Rejection from foreign counterpart Korean Patent Application No. 2016-7033517, dated Feb. 26, 2018, 8 pages.

Notice of Allowance from Foreign Counterpart Korean Patent Application No. 10-2016-7033517, dated Apr. 19, 2018, 5 pages.

Burns C.A., et al., "A Lazy Object-Space Shading Architecture with Decoupled Sampling," High Performance Graphics, Jun. 25, 2010, pp. 19-28.

Extended European Search Report for Application No. 15814163.0, dated Mar. 1, 2018, 14 pages.

Lindholm, et al., "NVIDIA Tesla: A Unified Graphics and Computing Architecture," 2008, IEEE Micro, vol. 28 (2), pp. 39-55.

Nakatani A., et al., "Resource Aware Rendering Using Amount of Surface Features of Object for Laser Plasma Type Three-Dimensional Display Device," Non-Profit Organization Virtual Reality Society of Japan, 2012, vol. 17 (4), pp. 419-428.

Notification of Reasons for Refusal from foreign counterpart Japanese Patent Application No. 2016-567897, dated Feb. 27, 2018, 5 pages.

Ragan-Kelley J., et al., "Decoupled Sampling for Graphics Pipelines", ACM Transactions on Graphics, vol. 30 (3), May 1, 2011, pp. 1-17.

Vaidyanathan K., et al., "Coarse Pixel Shading," Proceedings of HighPertormance Graphics and the Eurographics Association, Jun. 23, 2014, pp. 9-18.

Decision to Grant from foreign counterpart Japanese Patent Application No. 2016-567897, dated Oct. 16, 2018, 2 pages.

Burley B., et al., "Ptex: Per-face Texture Mapping for Production Rendering," Eurographics Symposium on Rendering, vol. 27 (4), 2008, 10 pages.

Condat L., et al., "Three-Directional Box-Splines: Characterization and Efficient Evaluation," IEEE Signal Processing Letters, Jul. 2006, vol. 13 (7), pp. 417-420.

Dammertz S. et al., "Textures on Rank-1 Lattices," Computer Graphics Forum, Oct. 2009, vol. 28 (7), 8 pages.

Fatahalian K., et al., "Data-Parallel Rasterization of Micropolygons with Defocus and Motion Blur," HPG 2009, ACM, Aug. 1-3, 2009, pp. 59-68.

Fatahalian K., et al., "Reducing Shading on GPUs using Quad-Fragment Merging," ACM Transactions on Graphics, vol. 29 (4), Article 67, Jul. 2010, pp. 67:1-67:8.

Heckbert P.S., "Fundamentals of Texture Mapping and Image Warping," Master Thesis, Jun. 17, 1989, 88 pages.

Meyer M., et al., "Generalized Barycentric Coordinates on Irregular Polygons," Journal of Graphics Tools, 2002, 5 pages.

Van De Ville D., et al., "Hex-splines: A novel spline family for hexagonal lattices," IEEE Transactions on Image Processing, Jun. 2004, vol. 13 (6), pp. 1-16.

Williams L., "Pyramidal Parametrics," Computer Graphics, ACM, vol. 17 (3), Jul. 1983, pp. 1-11.

* cited by examiner

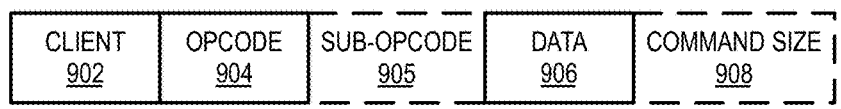
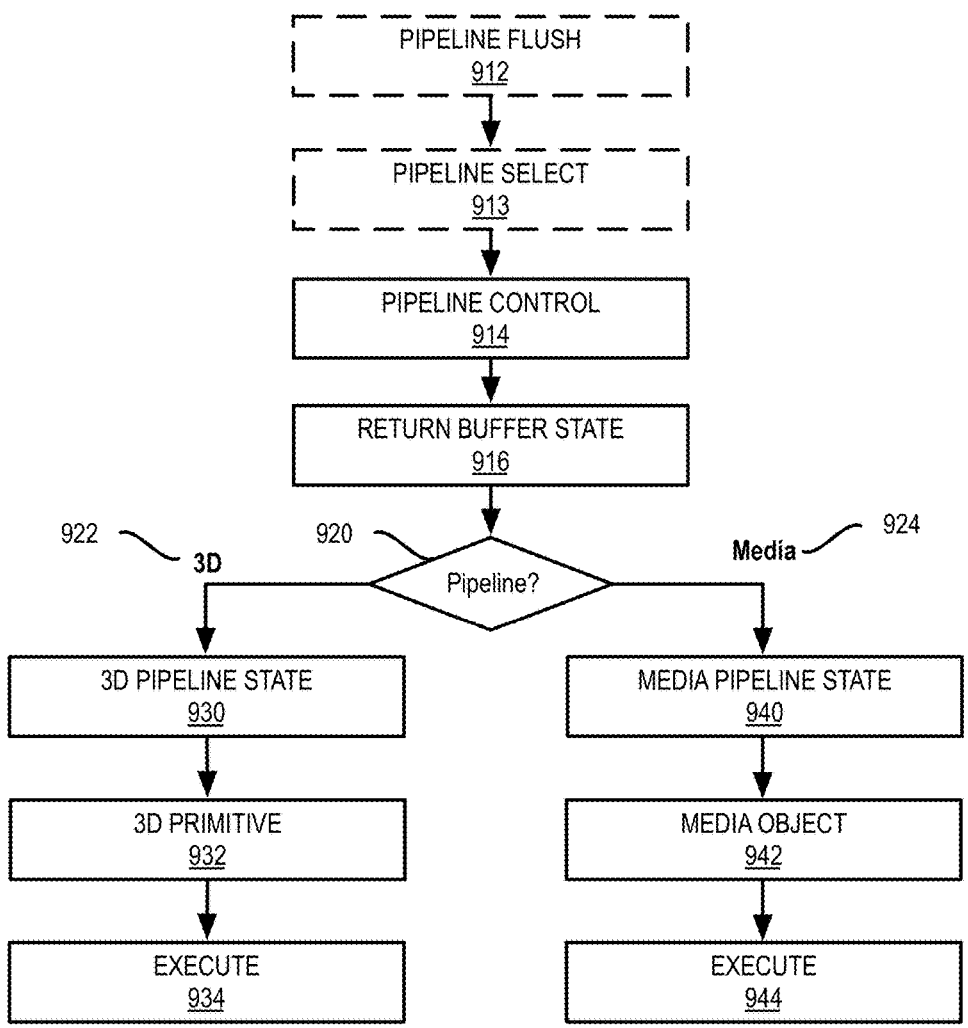

Clipping

Snapping

Extrapolation

METHOD AND APPARATUS FOR FILTERED COARSE PIXEL SHADING

BACKGROUND

Field of the Invention

This invention relates generally to the field of computer processors. More particularly, the invention relates to an apparatus and method for filtered coarse pixel shading.

Description of the Related Art

Coarse Pixel Shading (CPS) is an extension of the standard rasterization pipeline which implements a limited subset of decoupled shading. Simple, yet powerful, it can be regarded as generalization of multi-sample antialiasing (MSAA), where multiple render target samples per pixel are colored by the same shader evaluation. Motivated by increasing display resolutions, power-efficiency and perceptual considerations, CPS reuses the same shader evaluation across multiple pixels, while keeping the visibility super-sampled.

By construction, CPS inherits one quality issue of MSAA, which goes normally unnoticed in real-time rendering. The shader evaluation, which is now decoupled from visibility sampling, may no longer happen at a screen space location covered by the rasterized primitive. As shading is usually evaluated at pixel centers, partially covered pixels extrapolate the vertex attributes. This can lead to various artifacts, especially during texture sampling. Though centroid interpolation addresses this problem, it can lead to other artifacts causing temporal flickering and revealing internal triangle edges.

The reduction in shader evaluations takes effect when the rendered primitives cover several coarse shading pixels on the screen. Akin to standard rasterization pipelines, shading samples are not reused across triangle borders. For smaller triangles, which are getting more weight in modern workloads, shading cannot decrease below 2×2 coarse pixels per primitive, as the smallest unit of shading is a quad.

The need to further reduce the shading rate, making shading pixels even coarser, calls for a better color reconstruction of visibility samples than nearest neighbor sampling. Using filtering for CPS requires the evaluation of more shading quads around triangle boundaries, which amplifies the existing limitations: more redundant pixels will be interpolated, and attribute extrapolation becomes an even greater issue. Preliminary evaluations of bilinear filtering with CPS verified the existence of the artifacts.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

Figure 1:
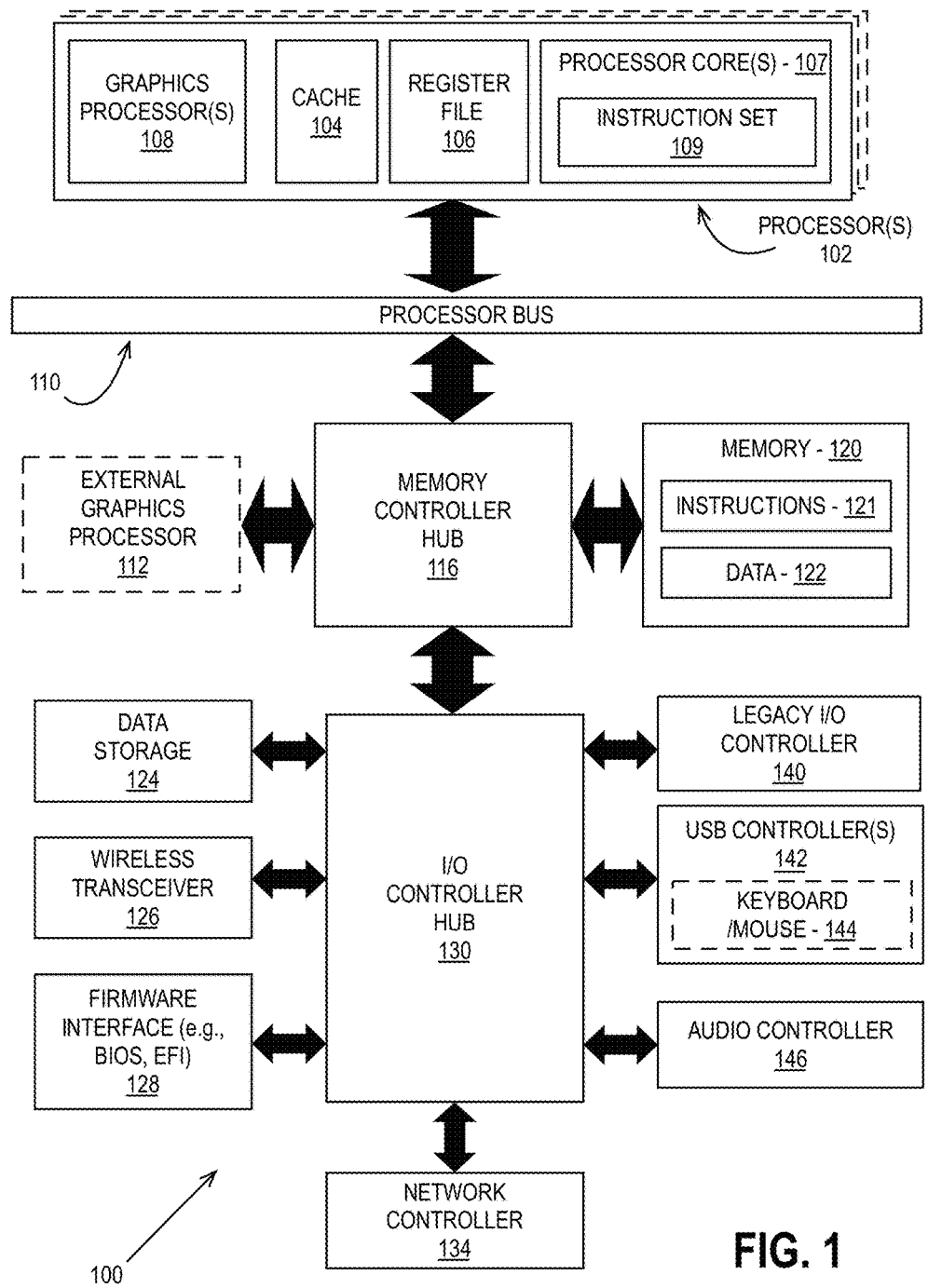
FIG. 1 is a block diagram of an embodiment of a computer system with a processor having one or more processor cores and graphics processors.
Figure 2:
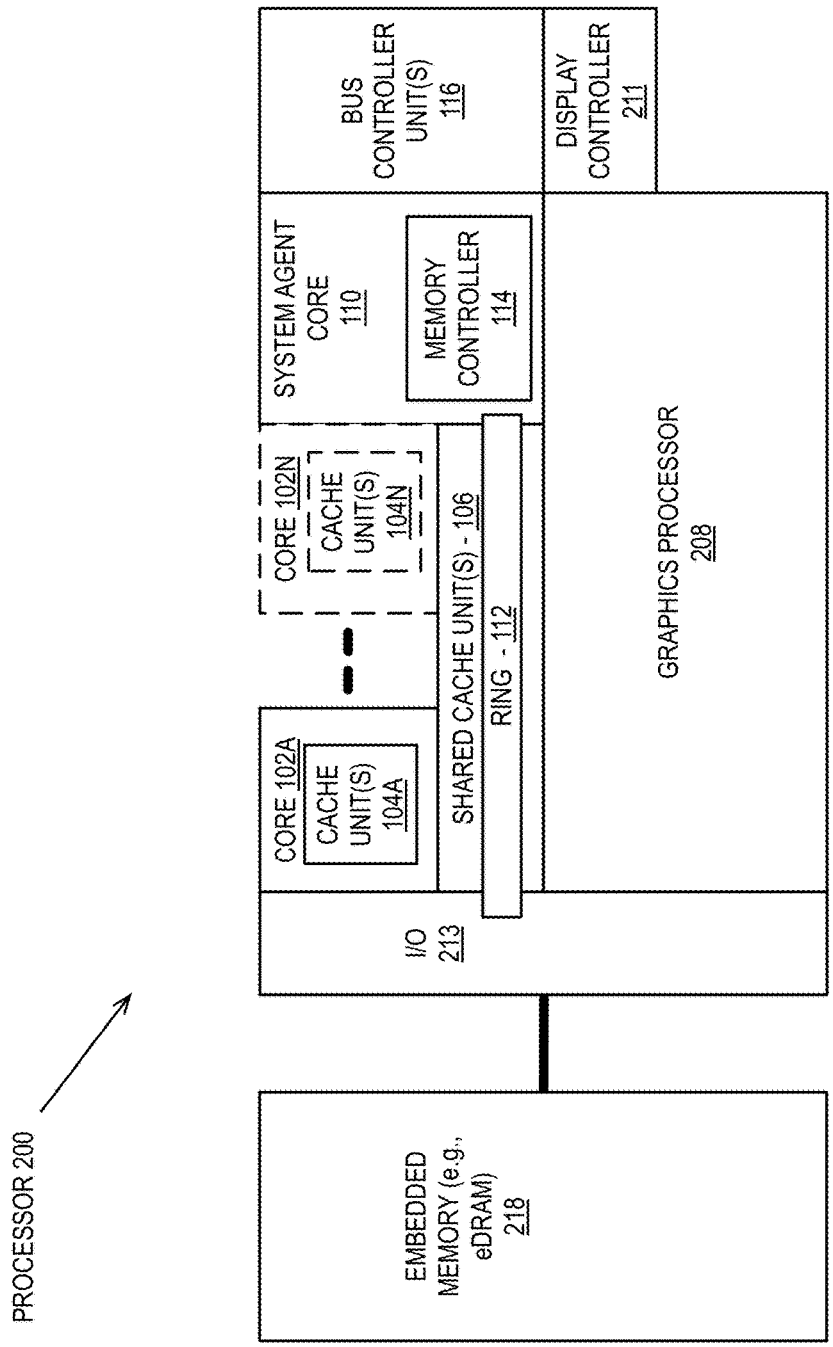
FIG. 2 is a block diagram of one embodiment of a processor having one or more processor cores, an integrated memory controller, and an integrated graphics processor.
Figure 3:
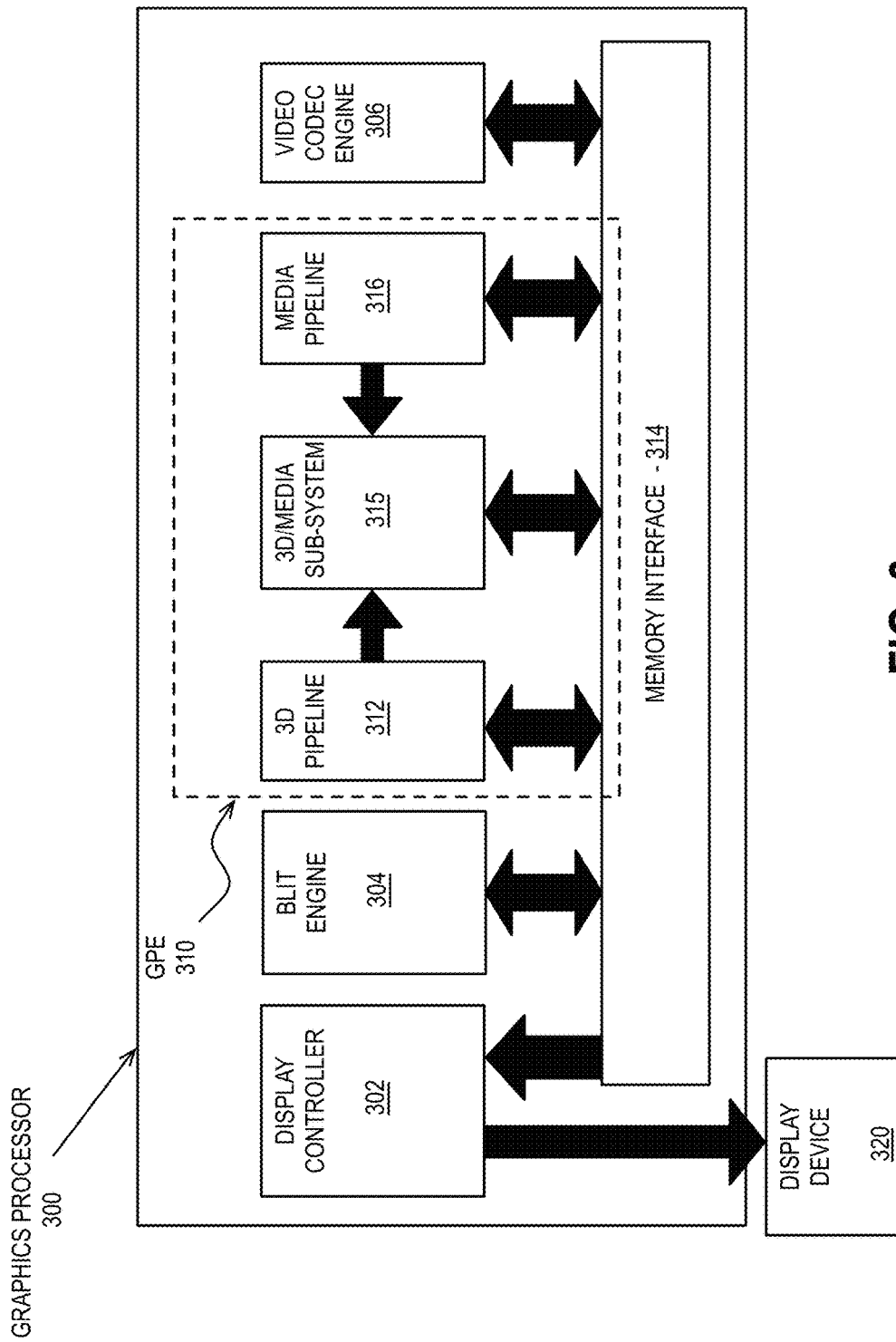
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processor 108 in the processor 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
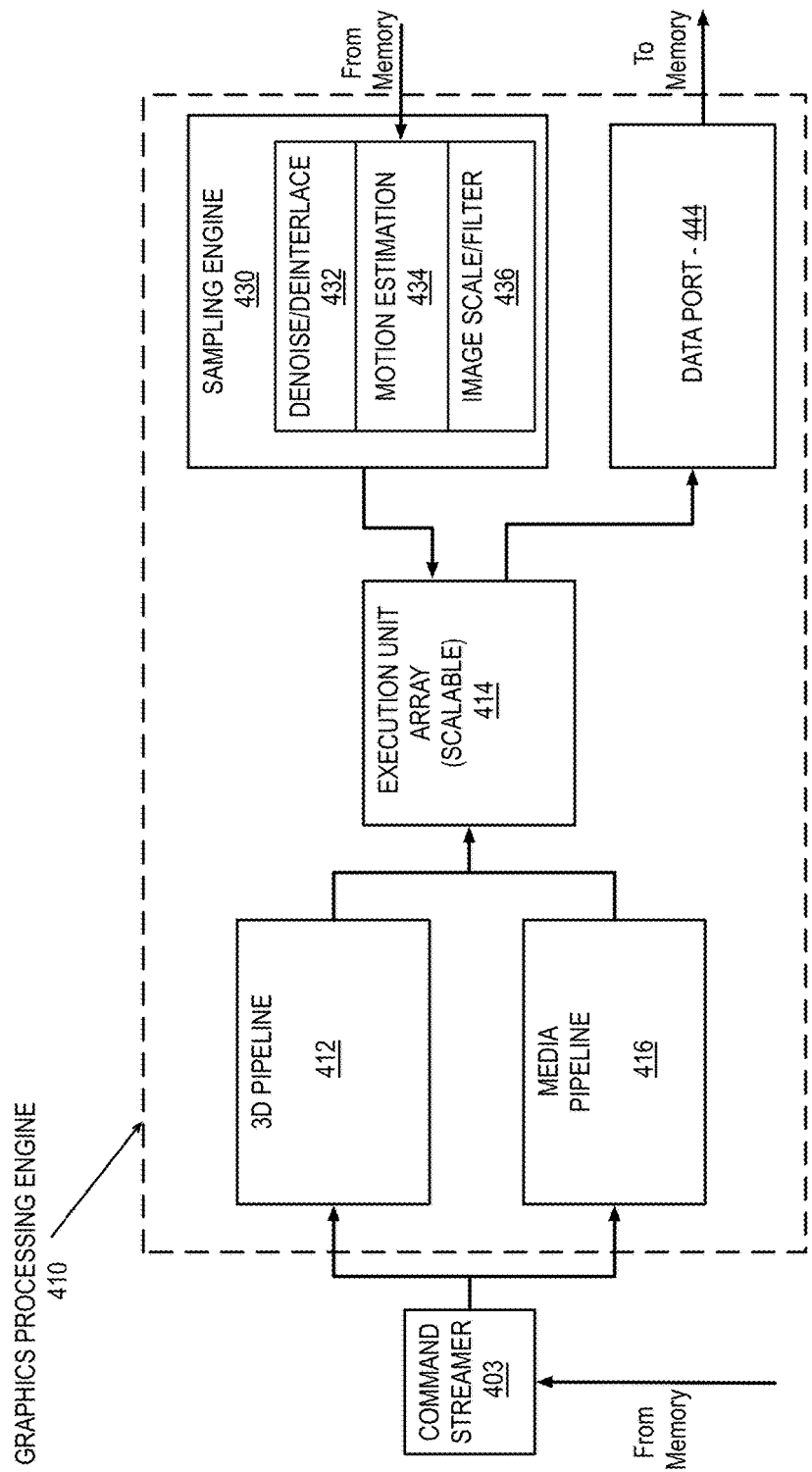
FIG. 4 is a block diagram of an embodiment of a graphics-processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
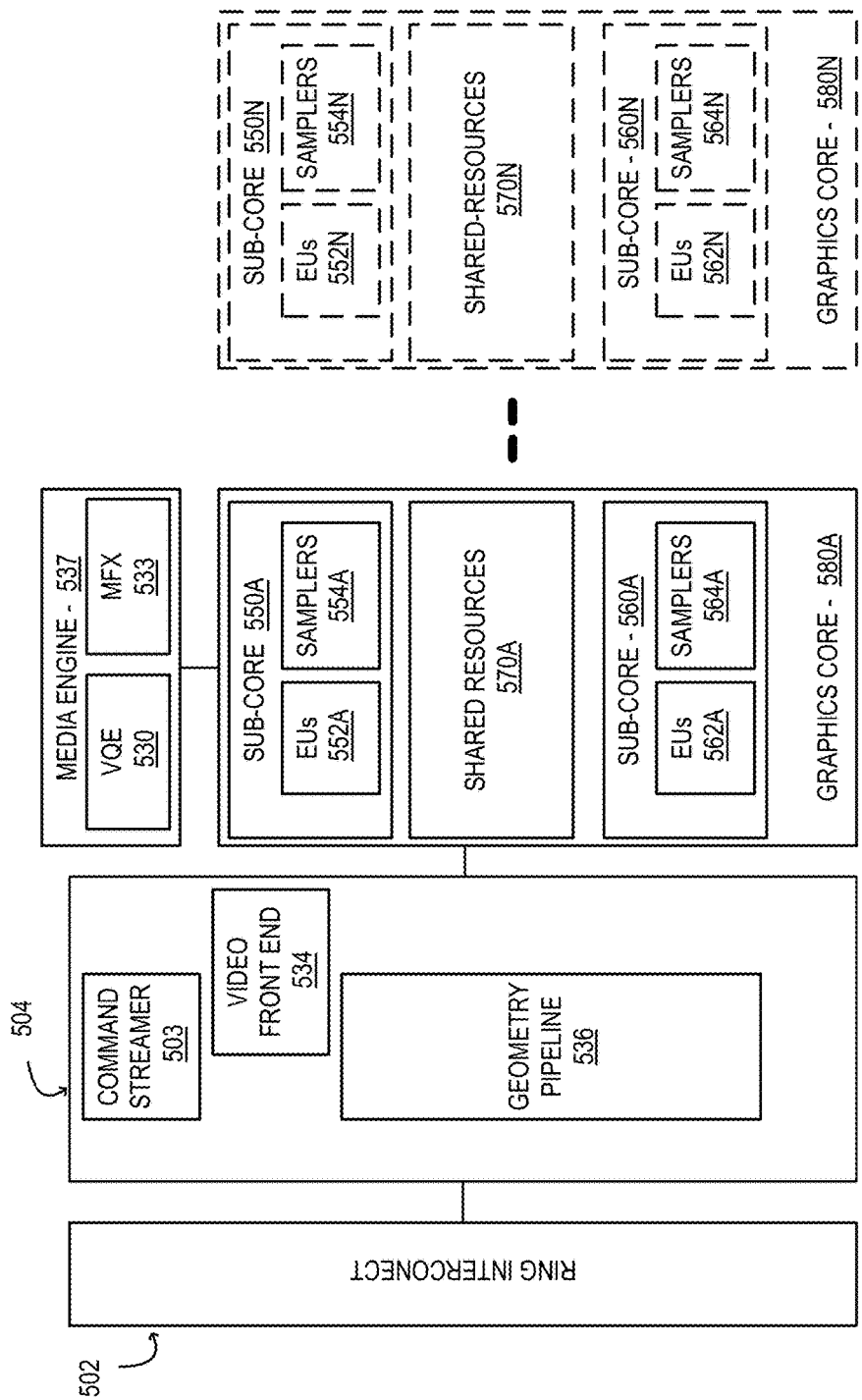
FIG. 5 is a block diagram of another embodiment of a graphics processor.
Figure 6:
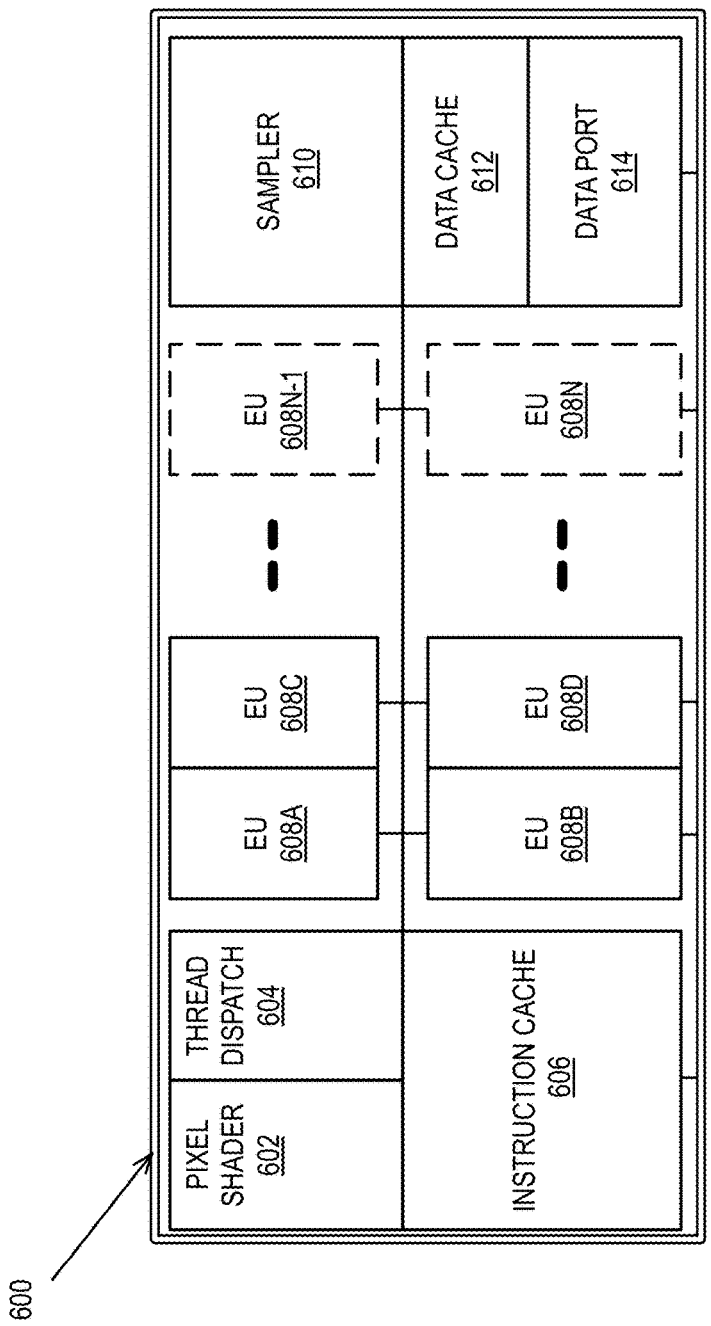
FIG. 6 is a block diagram of thread execution logic including an array of processing elements.
Figure 7:
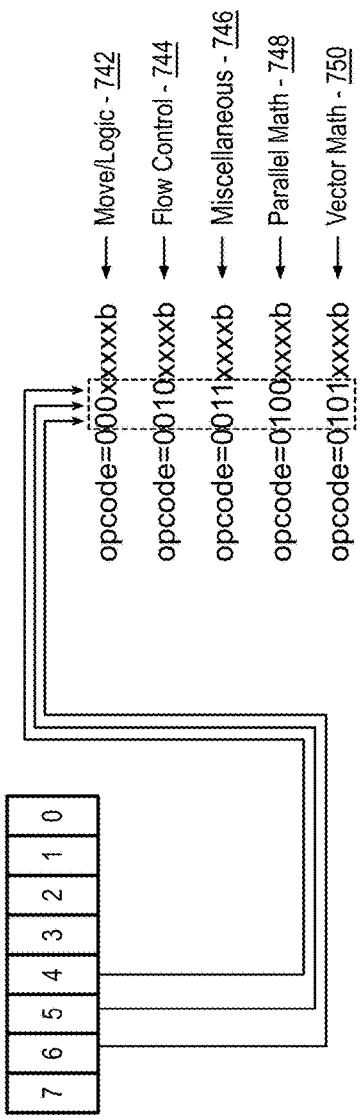
FIG. 7 illustrates a graphics processor execution unit instruction format according to an embodiment.

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
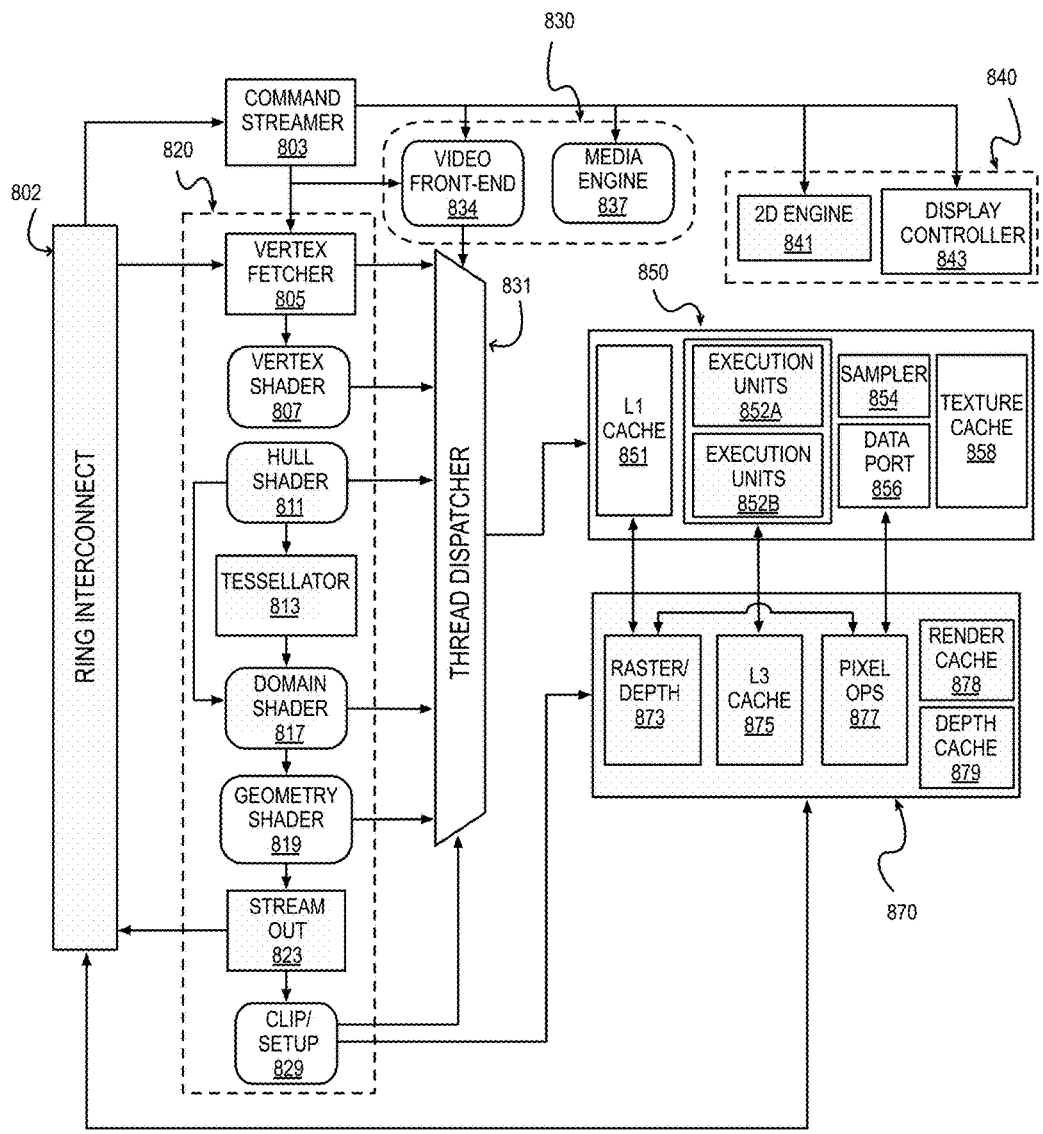
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct 3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
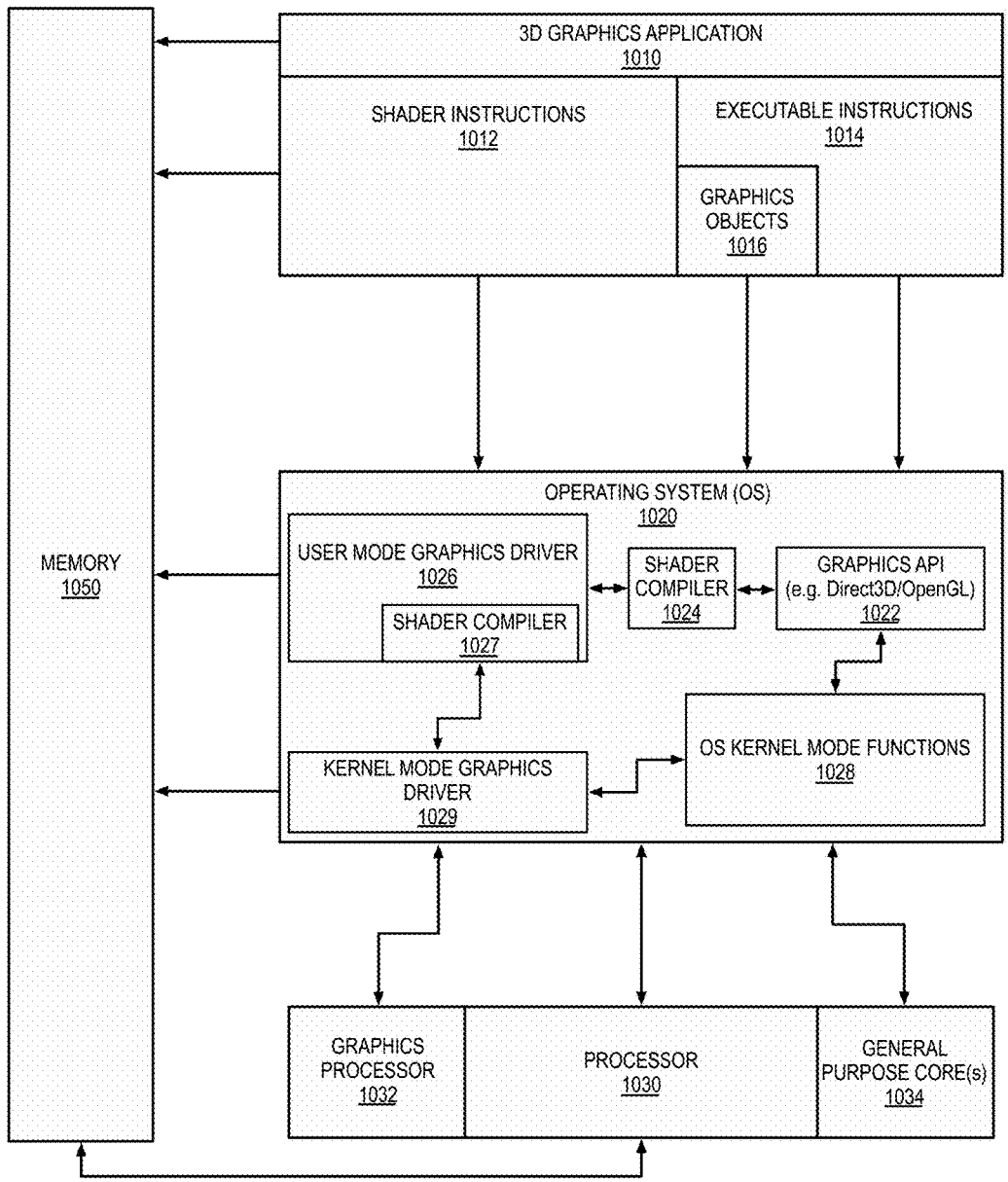
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct 3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Method and Apparatus for Filtered Coarse Pixel Shading

1. Overview

The embodiments of the invention described below address shading continuity issues related to coarse pixel shading (CPS) in rasterization-based graphics pipelines. For example, mismatching texture derivatives may cause sudden changes in texture level of detail. It has been determined that this artifact has been inherently present in rasterization-based pipelines which use per-triangle shader attribute derivatives, but it has not significantly impacted the image quality. However, with coarse shading rates the effect can create a significant artifact.

To address this issue, one embodiment of the invention pre-processes the mesh before rasterization, creating a unique tangent-plane parameterization of the desired smooth vertex attributes for each vertex. These embodiments replace the analytic shader derivatives based on a tangent-plane parameterization that ensures that all triangles that share the same vertex of the same mesh will use the same derivatives.

When used in combination with techniques that ensure that adjacent primitives evaluate shading at the same location (and avoid extrapolation), the embodiments of the invention ensure that textured surfaces appear fully continuous, even at extremely coarse shading rates (e.g. 4×4 or 8×8 pixel blocks). This is useful when a smooth surface is approximated with a limited number of polygons.

Briefly, the embodiments of the invention include the following techniques which improve the quality and/or efficiency of Coarse Pixel Shading (CPS):

(a) An alternative sampling pattern of shading space is implemented that avoids extrapolation artifacts and interpolates shared triangle edges at matching locations.

(b) High order filtering logic implements linear (or higher order) filtering for coarse shading samples.

(c) Motivated by the success of hexagonal grids in image processing, a hexagonal implementation is described below that supports similar clipping and filtering solutions to the orthogonal grid. As discussed below, for coarse shading rates, the hexagonal implementation produces sharper looking images in most cases.

(d) Shading is re-used across multiple primitives which can lead to significant performance gains with small triangle sizes. Primitive clusters may be built before rasterization to make coverage tests and shading attribute interpolation of multiple primitives efficient, on-chip.

Figure 11:
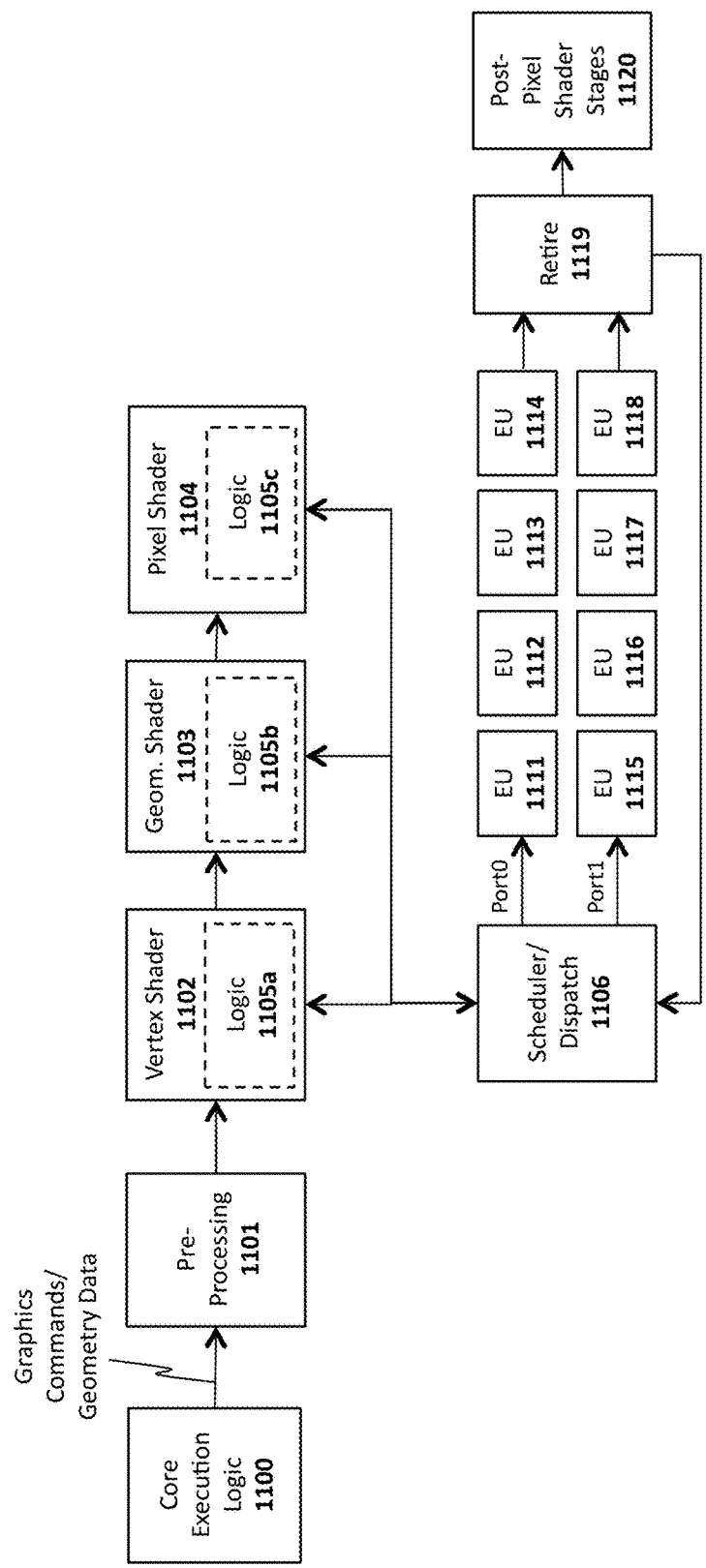
FIG. 11 illustrates an architecture on which embodiments of the invention may be implemented.

FIG. 11 provides an overview of a graphics pipeline in which the embodiments of the invention may be employed. In this embodiment, execution logic within a processor core 1100 transmits graphics commands and geometry data to the graphics pipeline which (in the illustrated example) includes a pre-processing stage 1101, a vertex shader stage 1102, a geometry shader stage 1103 and a pixel shader stage 1104.

As discussed in detail below, the pre-processing stage 1101 may perform operations such as collecting neighboring triangles for each vertex, iterating over the triangles, and executing linear attribute equations for each vertex.

Briefly, the vertex shader 1102 may perform coordinate space transformation and lighting operations to each vertex. For example, the vertex shader 1102 may transform the 3-D position of each vertex in virtual space to a 2-D coordinate at which it appears on the screen. Vertex shaders may manipulate properties such as position, color and texture coordinates. In one embodiment, the vertex shader 1102 also includes logic 1105a for performing operations related to the embodiments of the invention such as setting up per-vertex tangent plane equations (see, e.g., Smooth Texture Derivatives section below).

The geometry shader 1103 receives the results of the vertex shader 1102 (e.g., primitives, possibly with adjacency information) and generates new graphics primitives, such as points, lines, and triangles. For example, when operating on triangles, the geometry shader receives three vertices as input. The geometry shader may then generate can then emit zero or more primitives (e.g., triangles) which are passed to the rasterizer/pixel shader stage 1104. Common uses of a geometry shader include point sprite generation, geometry tessellation shadow, and shadow volume extrusion. The geometry shader 1103 also includes logic 1105b for performing operations related to the embodiments of the invention such as providing the per-vertex tangent plane equations to the pixel shader without interpolation.

The pixel shader stage 1104 breaks down the triangles (or other provided by the geometry shader) into fragments comprising pixel blocks. For example, depending on the implementation, the fragments may include 2×2 pixel blocks, 4×4 pixel blocks, 8×8 pixel blocks, etc. The pixel shader stage 1104 may also perform a depth test. Fragments that pass the depth test are written to the screen or may be blended with existing pixels (e.g., in a frame buffer). In addition, the pixel shader 1104 includes logic 1105c for performing various operations discussed below including, among other operations, generating results according to vertex tangent planes, and interpolating the results using barycentric coordinates.

Various additional/other graphics pipeline stages may also be used and are not illustrated here to avoid obscuring the underlying principles of the invention.

Returning briefly to FIG. 11, the vertex shader 1102, geometry shader 1103, and pixel shader 1104 (and any other components of the pipeline) may utilize a plurality of execution units 1111-1118 to execute their respective functions. In particular, threads from each of these components may be scheduled and dispatched for execution by a scheduler/dispatch unit 1106. The graphics instructions may be dispatched to the execution units 1111-1118 over one or more execution ports, as illustrated. Once execution is complete, a retirement unit 1119 retires the instructions, in some cases providing results back to the schedule/dispatch unit via a writeback bus.

One or more post-pixel shader stages 1120 may also be implemented to further process the pixels prior to rendering on a display device. By way of example, and not limitation, this may include final color selection and other pixel processing operations which are not performed by the rasterizer/pixel shader.

The following sections provide additional details of the operations performed to improve coarse pixel shading (CPS) in accordance with the embodiments of the invention. It should be noted, however, that some of the specific details provided below are not required for complying with the underlying principles of the invention.

2. Coarse Shading Without Extrapolation

In one embodiment, the operations described in this section are implemented by the logic 1105c within the pixel shader stage 1104. One embodiment of the invention uses per-triangle plane equations to interpolate triangle attributes for shading. With the advent of multi-sample anti-aliasing (MSAA) it is possible that the shading location is actually not covered by the triangle, which means that it is extrapolated. This extrapolation may be acceptable if the adjacent triangle actually covering the same shading location has a similar plane equation. However, if this is not the case, extrapolation would create a discontinuity over the surface. Shaders can also read texture coordinates not covered by the triangle, which could cause texture leak problems on silhouettes. While these artifacts are generally acceptable with MSAA, they become more noticeable with coarse shading pixels.

Figure 12C:
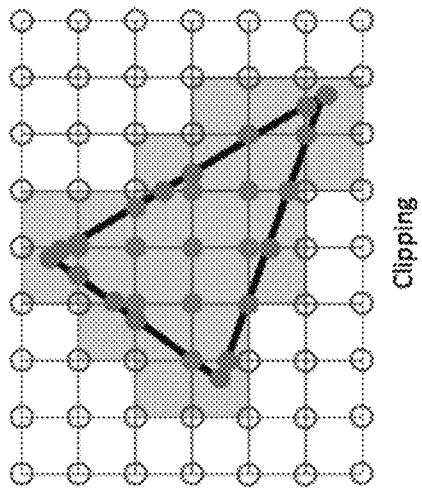
FIGS. 12A-C illustrate different shading techniques employed by embodiments of the invention.
Figure 12B:
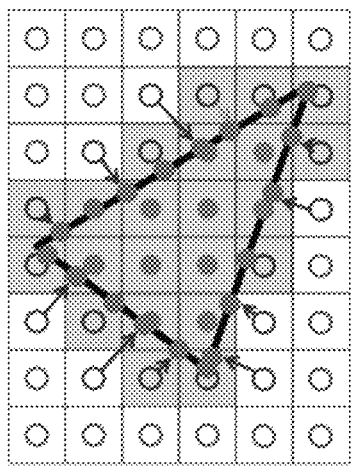
Figure 12A:
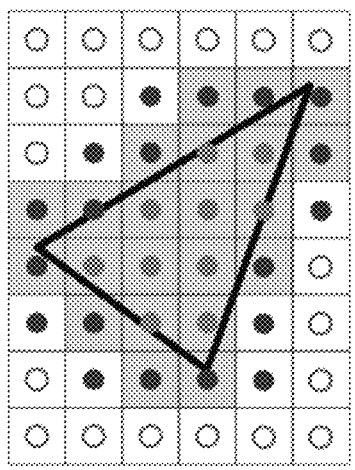

For the first part of this discussion, it will be assumed that shading reuse is limited to within a single triangle, as according to the current CPS definition. Linear (or higher order) filtering for coarse shading samples may work without discontinuities on edges if the edges of triangles are sampled in the shading space, and adjacent triangles use the same shading location on the common edge. Making this assumption, a shading parameterization with this property is chosen. The following options have been considered:

(a) Snap regular grid samples to triangle edges
(b) Clip the regular grid cells to match triangle edges
(c) Use a barycentric parameterization As illustrated in FIG. 12a, the original CPS samples the screen space on a regular grid. Each cell center is interpolated (and sometimes extrapolated) from its barycentric coordinates. Shading is then evaluated in quads of shading pixels. Finally, each visibility sample finds 4 nearest shading pixels and interpolates its color using bilinear interpolation. As shown in FIG. 12a, bilinear interpolation requires the shading of coarse pixels which were not directly covered by the triangle, amplifying the extrapolation problem (red shading samples in white pixels).

As illustrated in FIG. 12b, one way of avoiding extrapolation artifacts of a screen space shading grid is to snap external shading samples to the triangle boundaries. This approach can be achieved by clamping the barycentric coordinates of shading samples into the non-negative domain. However, such an approach suffers from multiple quality issues. First, adjacent triangles do not sample their shared edge at the same locations, which leads to discontinuities. Second, as the position of the shading samples may change, the filtering of shaded color in the visibility samples becomes non-trivial.

Barycentric parameterizations are not discussed here in detail. Their main idea is to define the shading grid in the triangle domain, which guarantees sample placement on the triangle edges. The samples can be placed uniformly either in screen space after projection, or in object space. One motivation is setup-free mesh texturing methods, such as Mesh Colors. One major problem with this idea is that it is not trivial to control the real shading density inside a triangular domain, especially in the case of "skinny" triangles.

Referring to FIG. 12c, in one embodiment of the invention, shading samples are shifted to the vertices of the shading grid. This leaves the number of samples unchanged, and the resulting shading is equivalent to CPS at fully covered shading pixels. However, in one embodiment, instead of interpolating attributes from triangle vertices directly, a fast, small 2D clipping is executed for each shading pixel against the triangle. The result is partially covered shading pixels, where the covered (valid) shading range is a convex polygon. The vertices of this polygon are either on the sides of the shading cell, or at the vertices of the triangle which increases the shading density near edges. However, it is important to note that unless point sampling was used before, the standard CPS used additional shading samples outside the triangle boundaries as well. Consequently, the total number of shading samples might even be less than in the case of extrapolation.

After evaluating the shading samples, they form a convex polygon for each clipped cell (0, or 3-7 vertices). The final color of each visibility sample is then computed as a weighted sum of the vertices of the shading polygon. In one embodiment, these weights are determined by using generalized barycentric coordinates, which can be easily defined over any convex polygon (see, e.g., Wachspress coordinates, described in [Meyer et al. 2002]). These coordinates are well-behaved: if a shading pixel is fully covered, they are equivalent to bilinear weights, and if a shading polygon is a triangle, the result is normal barycentric coordinates.

2.1 Higher Order Filtering

In one embodiment, the operations described in this section are performed by logic 1105c within the pixel shader stage 1104. Coarse Pixel Shading (CPS) can be regarded as a magnification problem. The surface shading of a triangle is a signal that is continuous almost everywhere (except for cases where visibility creates sudden discontinuities, such as silhouettes and hard shadows). When sampling this signal at the coarse shading grid, an appropriate pre-filter may be applied to avoid texture aliasing. In the final step, the coarse shading grid is up-sampled at the location of the visibility samples, which is similar to the magnification of an image.

Consequently, quality results cannot be expected from simple reconstruction filters such as nearest or bilinear filtering, when the level of magnification is significant. As a comparison, a higher order reconstruction filter was implemented, which uses one additional ring of shading samples around the currently shaded quads, and evaluates the filtered color at each pixel using bicubic spline interpolation.

2.2 Shading on Hexagonal Grids

The operations described in this section may be performed by logic 1105c within the pixel shader stage 1104. In one embodiment, the coarse shading space is sampled on a hexagonal instead of a regular orthogonal grid. While orthogonal grids are the most suitable for representing the frame-buffer, given that current displays arrange their pixels in this pattern, they sample the 2D plane with a poor efficiency. As CPS essentially decouples shading from visibility, a different representation of shading grid may be used, potentially leaving all the other aspects of the previously introduced pipeline unchanged.

Figure 13:
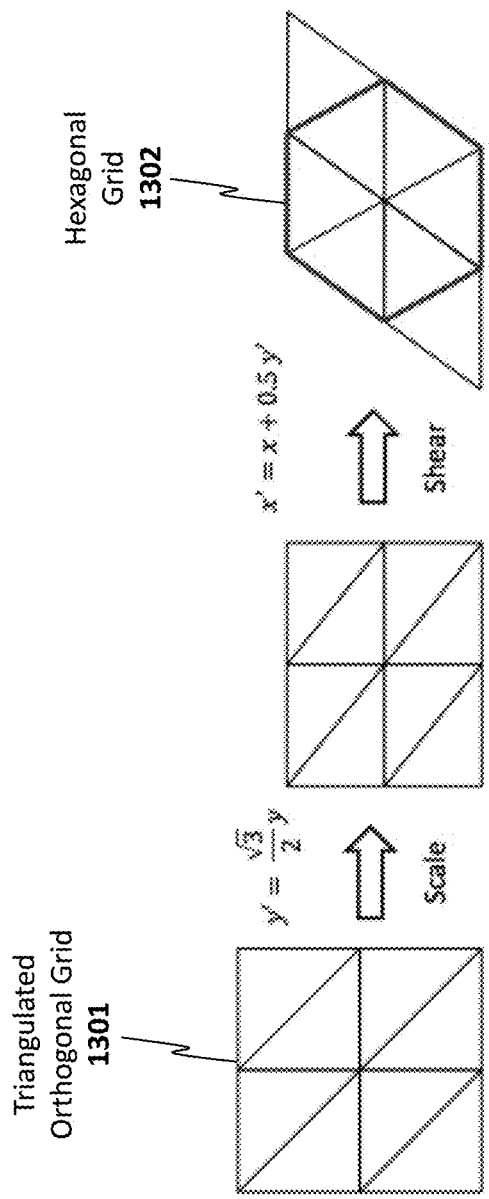
FIG. 13 illustrates a vertical scaling and horizontal shearing operation employed in one embodiment of the invention.

In one embodiment, the coarse shading pipeline is modified to shade on a hexagonal lattice. A hexagonal lattice can be constructed by placing shading vertices on vertices of perfect triangles. As illustrated in FIG. 13, in one embodiment, this is accomplished by applying a vertical scaling and horizontal shearing operation to the triangulated orthogonal grid 1301 with an appropriate triangulation to arrive at the hexagonal grid 1302. The Voronoi cells of the resulting grid will be hexagons instead of squares. Note that this transformation requires scaling with an irrational number, which can only be approximated in practice. Other approximations may also be used, which are numerically more stable, such as rank-1 lattices [Dammertz et al. 2009].

In one embodiment, during coarse shading, the nearest three shading vertices are located by applying the inverse of this transformation to the visibility sample, and the orthogonal coarse pixel is located as in previous implementations. The image of this coarse pixel in the sheared grid is a parallelogram. Testing the visibility sample against the shorter diagonal of this parallelogram defines the nearest triangle in the hexagonal grid.

One embodiment of the invention implements an extrapolation-free variant of hexagonal shading. For this, the rasterized triangle is clipped against the nearest shading triangle which contains the current visibility sample. The resulting convex polygon can be treated identically to the orthogonal coarse grid, using generalized barycentric interpolation.

2.3 Filtering on Hexagonal Grids

The operations described in this section may be performed by logic 1105c within the pixel shader stage 1104. The hexagonal nature of the grid implemented in one embodiment of the invention is revealed during nearest filtering. This reduces general aliasing (near-vertical lines are better reconstructed by regular grids as a special case) and provides better sampling of the 2D plane. Linear filtering can be also defined on a hexagonal grid: bilinear interpolation has been used within the orthogonal coarse pixels; barycentric interpolation may now be used across the triangle vertices. Unfortunately linear filtering reveals the triangle edges of the lattice. Its inability to reproduce straight lines often makes the final results worse than in the case of the orthogonal grid, despite the denser sampling. Higher order reconstruction filters may be used in one embodiment.

The bicubic reconstruction filter discussed above would not be suitable to use directly in this case, as its tensor product (separable) representation is not capable of exploiting the isotropy and twelve-fold symmetry of hexagonal grids. On the other hand, there exist other generalizations of the one-dimensional B-splines that have been designed and successfully applied for reconstruction of hexagonally sampled data in the past. Hex-splines are obtained by multiple convolutions of the indicator function of the hexagonal Voronoi cell, and provide high-quality filters of arbitrary degrees [Van De Ville et al. 2004]. Three-directional box-splines are a special class of box-splines that are particularly suitable for hexagonal sampling [Condat and Van De Ville 2006]. Both hex-splines and box-splines preserve the isotropic and symmetric properties of the hexagonal sampling. In one embodiment of the invention, an efficient implementation of second-order box-splines such as described in [Condat and Van De Ville [2006]] is used.

Quality comparison against the orthogonal sampling using bicubic filtering and the hexagonal sampling using second-order box-splines provides improved results than the linear case. The images obtained by the hexagonal sampling are generally sharper. This is partly because the second order box-splines result in 4-degree polynomials, while the bicubic filter leads to 6-degrees. The number of shading points participating in the reconstruction filter is 14 com-pared against 16 of the bicubic case.

3. Texture Filtering for Coarse Shading

A practical shader almost always relies on texture information. Texture data is usually assumed to be a continuous signal (which may be stored in a sampled, discrete form), that needs to be prefiltered to avoid aliasing when being shaded on a regular grid. Prefiltering should remove frequencies from the signal that cannot be reconstructed after the sampling process. During regular shading, each sampling location represents a pixel (or a finer subsample with supersampled antialiasing). When using CPS, the coarse shading grid may be resampled on a per-pixel frequency, which means an additional signal-processing step. Experiments indicate that texture filtering requires special considerations when using coarse shading resolution. Interestingly, the texture filtering implementation of the standard rasterization pipeline suffers from multiple imperfections, which are acceptable, and generally not noticeable during regular rasterization. Some of these imperfections, however, become readily apparent with coarse shading.

3.1 Texture Filter Width

The dimensions of the texture filter are selected based on the estimated footprint of the shaded pixel in texture space, which can be closely approximated with an ellipse [Heckbert 1989]. The dimensions and orientation of this ellipse depend on the partial derivatives of the u, v texture coordinates with respect to the x, y screen space locations. A high-quality texture filter, such as the Elliptical Weighted Average (EWA) algorithm proposed by Heckbert, computes the convolution of the texture signal with a smooth anisotropic reconstruction filter aligned with this ellipse. Real time applications reduce the number of texels within the filter area by precomputing multiple LoD levels of the texture, storing it in a MIP pyramid [Williams 1983].

In one embodiment, the hardware implementation of texture filtering selects a filter width corresponding to the diameter of the shaded pixel in texture space. This is a design decision present in the current OpenGL and Direct 3D specifications, which results in sharper texture appearance, but in fact suffers from aliasing artifacts. To understand why, consider rendering a screen-aligned quad with a checkerboard texture, where the size of a black or white square exactly matches the pixel size. When the texels of this quad are perfectly aligned with the shading pixels, the sampled image matches the texture exactly. However, when being translated half a shading pixel along the screen, filtering inside the pixel footprint results in a uniform gray color.

From a signal processing point of view, the standard rasterization pipeline selects a texture filter width that violates the Nyquist frequency limit. Ideally a pixel should integrate across at least twice its radius 1 (to sample a signal with at least twice of its frequency). We think this is a design decision for texture sharpness, as practical textures do not exhibit the extreme frequencies of our previous checkerboard-example. However, in experiments with coarse shading severe texture aliasing may result when using the Direct 3D definition of anisotropic filtering. To alleviate this, one embodiment of the invention performs biasing of the texture gradients with a factor of 2, which eliminates most aliasing but results in blurrier texture-appearance.

3.2 Filter Overlap

Even if all shading samples are placed inside the triangle, the texture filter will still cover parts of the texture space outside the triangle. This is the expected behavior across internal edges, as it can help to preserve the smoothness of the shading over the surface. On the other hand, it can cause texture leak problems on silhouette edges in texture space. Reducing the shading rate of CPS requires larger texture filters (thus higher MIP levels), which means that all texture leak artifacts become more pronounced.

Texture atlases particularly suffer from these artifacts, where it is difficult to avoid color leaks across texture seams. This suggests that future pipelines that rely on coarse shading should avoid using texture atlases when possible. Recent advances in setup-free texture formats, such as Ptex [Burley and Lacewell 2008], and the introduction of bindless textures offer a better alternative. Until then, care should be taken with texture atlas preparation that leaks do not cause a visible problem with practical shading rates.

3.3 Problems with Texture Derivatives

One motivation behind the efforts to avoid extrapolation as described herein is to preserve the continuity of shading across primitives. In regular rasterization the rendering pipeline uses extrapolated attributes only to complete shading quads. The extrapolated "helper pixels" never get actually written into the frame buffer, and their primary purpose is to compute finite differences of texture sampling (the only exception is MSAA with sample-level shader execution). CPS, however, actively uses such pixels to reconstruct colors of visibility samples. This causes shading discontinuities across edges if the adjacent triangles were not sharing the same plane equations. Clipping employed in one embodiment ensures that shading is evaluated at the same locations on the edge. As the shading attributes depend only on the two vertices of the edge, they will match for both primitives.

When evaluating this solution against CPS with extrapolation, shading may still appear discontinuous, revealing triangle boundaries. The problem is that there are components of shading which depend not only on the interpolated vertex attributes but also on their screen space derivatives. Texture sampling is the best example for that, and being present in almost all practical shading scenarios, the problem was investigated more closely.

No previous measure has been taken to match the texture differentials across the adjacent triangles; each triangle has been set up independently. As a result, there is a small difference in texture derivatives across triangles, causing mismatching texture lookups. While in most cases this is not noticeable with per-pixel shading, decreasing the resolution of shading makes this a significant problem. The reason is that the texture LoD selection needs compensation: for example by reducing the resolution of the shading grid with a factor of two, the texture derivatives need to be increased accordingly. A previous mismatch between texture derivatives gets multiplied with the same factor. In fact, the resulting artifacts can be so severe that they can make the benefits of extrapolation-free CPS less noticeable.

In the following analysis, the goal is to identify techniques which ensure that not only vertex attributes, but also their first derivatives match in coarse shading locations. The analysis is limited to texture derivatives, and it is assumed that these derivatives can be evaluated analytically. A more general solution would be to interpolate texture attributes in a way that their finite differences match, however, this is much more difficult and would also change the appearance of the surface (texture coordinates would shift). First, a formal definition of the texture derivative problem is provided. Then, one embodiment of a solution which works with smooth surfaces is introduced.

Figure 14:
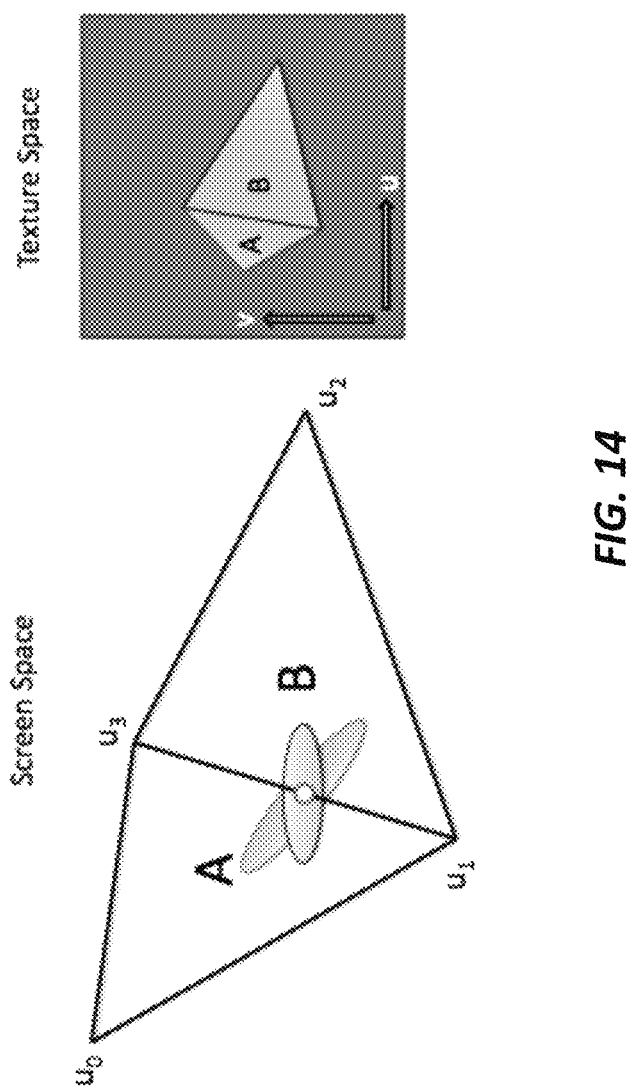
FIG. 14 illustrates one embodiment of a mapping between texture space and screen space.

Consider two adjacent triangles, A and B as illustrated in FIG. 14. One component of the texture coordinates, u, is a scalar attribute defined at four different vertices, $u_0$, $u_1$, $u_2$, and $u_3$. During rasterization, the vertices are projected to screen space, and u is perspective-correctly interpolated over the screen: the values 1/w and u/w are linearly interpolated, where w is the homogeneous coordinate. For both triangles, these interpolations can be performed by solving two-dimensional plane equations:

$$\frac{u_A}{w_A} = A_A^u + B_A^u x + C_A^u y;$$

$$\frac{u_B}{w_B} = A_B^u + B_B^u x + C_B^u y$$

$$\frac{1}{w_A} = A_A^w + B_A^w x + C_A^w y;$$

$$\frac{1}{w_B} = A_B^w + B_B^w x + C_B^w y$$

u can then be interpolated perspective-correctly by solving the rational expression:

$$u = \frac{u/w}{1/w} = \frac{A_X^u + B_X^u x + C_X^u y}{A_X^w + B_X^w x + C_X^w y}$$

The two plane equation-pairs "intersect" each other on the shared edge, resulting in same vertex attributes along the edge. However, the attribute derivatives depend on the other two vertices as well. For example, the partial derivative ∂u/∂x can be written as $$\frac{\partial u}{\partial z} = \frac{(A^w + B^w x + C^w y)B^u - (A^u + B^u x + C^u y)B^w}{(A^w + B^w x + Cwy)^2}$$

$$= (B^u - uB^w)w.$$

A detailed derivation of analytic derivatives can be found in [Munkberg and Clarberg 2010]. It is easy to see that the derivatives evaluated for the two triangles do not match in the general case:

$$B_A^u - uB_A^w \neq B_B^u - uB_B^w.$$

3.4 Smooth Texture Derivatives

One embodiment of the invention used to solve this problem for smooth surfaces is motivated by the fact that these triangles are only coarse, piecewise linear approximations of the rendered surface. Therefore, one could replace the "flat" texture derivatives with derivatives of a smooth surface. Such derivatives have no sudden discontinuities on vertices or edges. Shading typically replaces the triangle normals with per-vertex shading normals, which are then interpolated across the triangles, resulting in smooth lighting of the tessellated surface. Something similar may be done with the texture derivatives.

Referring back to the equations above, for each vertex, the plane equations may be set up for each triangle that contains that vertex, and solved for the given screen space location. The texture derivatives in the vertex could be then the average of the solutions, and within the triangle, the per-vertex derivatives can be interpolated using the barycentric coordinates. This technique ensures continuous shading over the triangle. On the other hand, the number of plane equations would grow linearly with the vertex valence, and such a solution is definitely not practical in a rasterization pipeline (it is important to remember that the plane equations cannot be averaged, as it would mean averaging the nominator and denominator of a rational polynomial). Instead, a different approach is employed in one embodiment of the invention which is based on per-vertex tangent planes.

Figure 15:
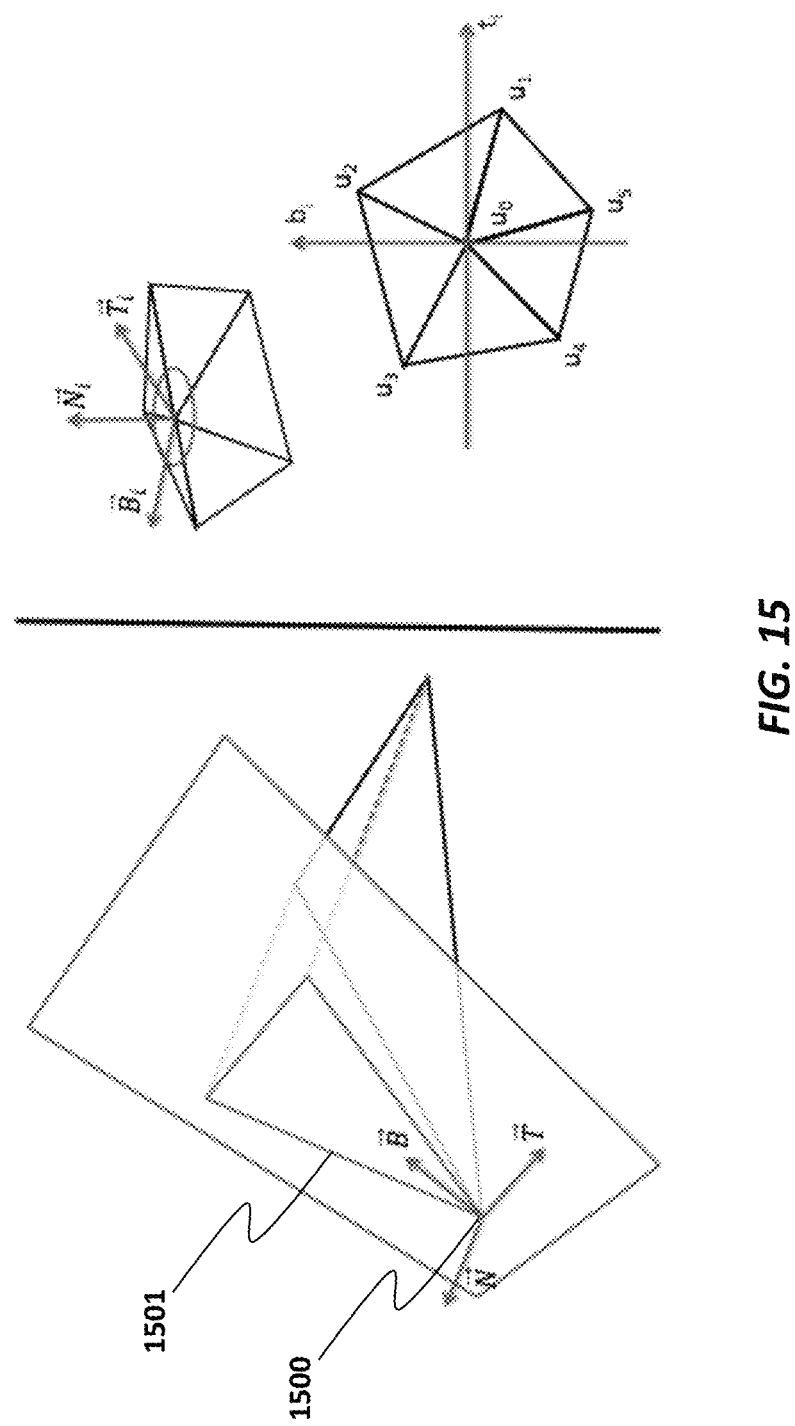
FIG. 15 illustrates how texture derivatives may be computed at a vertex using a triangle that lies in the tangent plane of the given vertex.

First, assume a single triangle, representing a smooth surface. Each vertex of this triangle defines its own tangent plane, not necessarily coplanar with the triangle. During the rasterization of this triangle, the texture derivatives may be replaced to better approximate a smooth surface. In the vicinity of vertex $v_i$, the derivatives are computed as if the triangle was lying in the tangent plane span by $\vec{T}_i$, $\vec{B}_i$ (See FIG. 15 left). Specifically, in the left portion of FIG. 15, texture derivatives are computed at a vertex 1500 using a triangle 1501 that lies in the tangent plane of the given vertex. Every point on this tangent plane can be parametrized with two scalars $t_i$, $b_i$:

$$\vec{p}_i(t_i, b_i) = \vec{v}_i + \vec{T}_i t_i + \vec{B}_i b_i$$

The other two vertices of the triangle can be projected to the same tangent plane, and using their t–b parameters, a linear equation can be set up for each vertex attribute:

$$u = A_i^u + B_i^u t_i + C_i^u b_i$$

The idea is to have linear plane equations for 1/w, t/w and b/w in screen space, similar to the interpolation of barycentric coordinates. For example, the following can be solved for the tangent plane of each vertex:

$$t_i(x, y) = \frac{A^{t_i} + B^{t_i} x + C^{t_i} y}{A^{w_i} + B^{w_i} x + C^{w_i} y}$$

From this, the modified texture derivatives in the vertex tangent plane can be determined:

$$\frac{\partial u}{\partial x} = B_i^u \frac{\partial t_i}{\partial x} + C_i^u \frac{\partial b_i}{\partial x},$$

where $$\frac{\partial t_i}{\partial x} = (B^{t_i} - t_i B^{w_i}) = w.$$

At an arbitrary point inside the triangle, the texture derivatives may be determined using the plane equations of the three vertices independently. They are then interpolated using the barycentric coordinates. This technique requires three more plane equations per vertex for the tangent planes (t/w, b/w, 1/w), and one plane equation for each attribute.

Notice that in this embodiment, a unique parametrization has been introduced for each vertex which can be shared by all triangles containing the same vertex. This technique can be extended for smooth derivatives over a network of triangles, using a simple preprocessing step. Before rasterization, an iteration may be performed over all vertices, and each neighboring triangle projected to its tangent basis. For each vertex attribute, this results in a linear plane equation per triangle. In the right portion of FIG. 15, for example, the "average" vertex attribute equation can be derived by projecting all neighboring triangles to the same tangent plane, and using the tangent and binormal as a new basis. Since these equations are linear, an average plane equation can be determined which approximates the behavior of the attribute in the neighborhood of the vertex $v_i$:

$$u_i = \frac{1}{N}\sum_{k=1}^{N} A_{ik}^u + B_{ik}^u t_i + C_{ik}^u b_i$$

Figure 16:
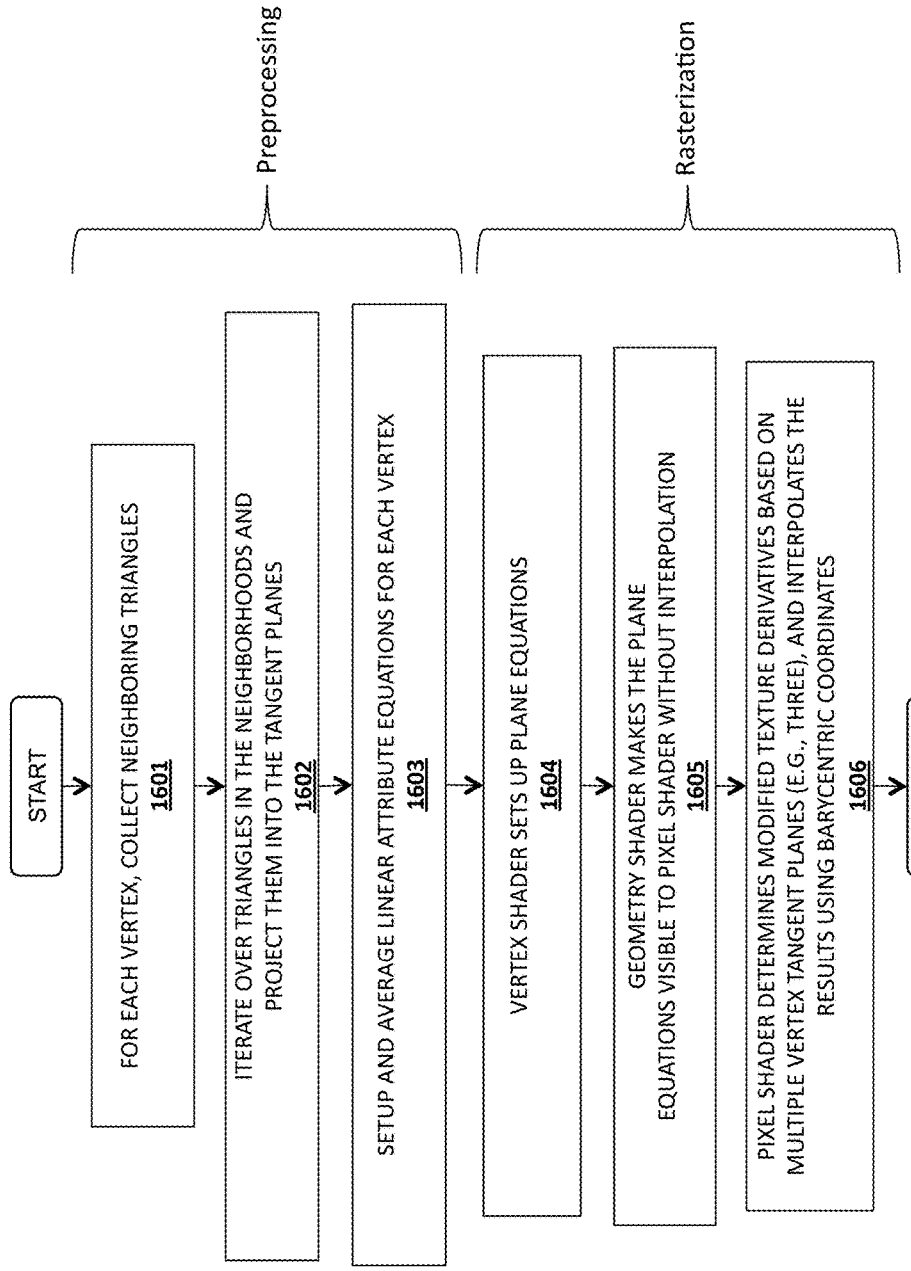
FIG. 16 illustrates a method in accordance with one embodiment of the invention.

A method according to one embodiment of the invention is illustrated in FIG. 16. While the method may be implemented according to the specific details and architectures set forth above, it is not limited to some of these specific details.

As illustrated, the method includes a set of preprocessing operations 1601-1603 and a set of rasterization operations 1604-1606. Turning first to the pre-processing operations, at 1601, for each vertex, neighboring triangles are collected. At 1602, the method iterates over the triangles in the neighborhoods and projects them into the tangent planes (e.g., $\vec{T}_i$, $\vec{B}_i$ in the embodiment discussed above). At 1603, linear attribute equations are setup and averaged for each vertex (e.g., $u_i(b_i, t_i)$) in the example above. In one embodiment, the preprocessing operations are performed at the preprocessing stage 1101 of the graphics pipeline illustrated in FIG. 11.

Turning to the rasterization portion of the method, at 1604, logic 1105a within the vertex shader 1102 sets up the plane equations (e.g., the plan equations for t/w, b/w, 1/w). At 1605, logic 1105b within the geometry shader 1103 makes the per-vertex plane equations visible to the pixel shader 1104 without interpolation. At 1606, logic 1105c within the pixel shader 1104 determines modified texture derivatives based on three vertex tangent planes, and interpolates the results using barycentric coordinates. For example, in one embodiment, the pixel shader solves:

$$\frac{\partial u}{\partial x} = B_i^u \frac{\partial t_i}{\partial x} + C_i^u \frac{\partial b_i}{\partial x},$$

where $$\frac{\partial t_i}{\partial x} = (B^{t_i} - t_i B^{w_i})w.$$

3.4.1 Silhouettes

The above approximation may not work in cases where the per-vertex tangent plane becomes backfacing, which happens near silhouette edges. The preprocessing step may be modified to eliminate such tangent planes, the original, per-triangle derivative computation may be used.

A view-dependent variant of the preprocessing step has been implemented. One disadvantage of this approach is that the preprocessing needs to be done before rendering each frame. The idea is to weight the influences of neighboring triangles based on their orientation: as a triangle gets closer to a silhouette (e.g. by testing its normal against the per-vertex view direction) it should affect the computation of both the tangent plane and the linear attribute equations with a smaller factor. This method guarantees that tangent planes never get backfacing.

If the cost of the above preprocessing is prohibitive, a similar per-vertex blending can be used between the smooth texture derivatives and the derivatives of the original triangle. As the tangent plane approaches the silhouette, the derivatives revert to the original ones. This means, that on the silhouettes texture smoothness cannot be guaranteed.

3.4.2 Aliasing

The techniques described above guarantee continuous texture derivatives, but improvements can be made with respect to aliasing. The techniques may be modified to ensure that the derivatives are never smaller than the original discontinuous version.

4. Clustered CPS

When rendering a complex scene, the rasterization pipeline usually ends up executing significantly more pixel shaders than the resolution of the frame buffer. Ideally computational resources should be spent on the visible fragments only; any pixel shader above that is considered redundant. The main reasons for shading redundancy are depth complexity;

partially covered pixels, which are shaded by multiple primitives; and the quad-based scheduling of shading.

While some embodiments of CPS aim to significantly reduce shading costs, the above factors limit its efficiency with densely tessellated, complex geometry. The way the hardware schedules shader execution is particularly important. In order to compute finite differences for texture LoD selection, pixel shaders may be executed as 2×2 quads. Therefore, it often happens that pixels that are not actually covered by the current primitive need to be shaded as well. The overhead of this redundancy grows as the size of the rasterized primitives decreases. Fatahalian et al. conducted thorough studies of this effect related to micropolygon renderers [Fatahalian et al. 2009] [Fata-halian et al. 2010]. The problem of CPS is that by increasing the size of shading pixels, some tessellated workloads generate similar overhead to micropolygon shading. The number of partially covered and not covered shading quads further increases when filtering is used. This problem has been addressed in one embodiment using clustered primitive shading.

Reusing shading across multiple primitives during rendering is a key motivation. The screen space coordinates used by rasterization already provide a shared parameterization; only the primitives that belong to a continuous surface need to be identified. A clustering operation is performed before the rasterization stage that reuses the same CPS grid over primitives that (1) share an edge with the same vertex attributes; and (2) have the same facing. The basic principle is very similar to quad fragment merging, as described by Fatahalian et al. [2010]. While their pipeline is designed for micropolygon grids in particular, where the dicing stage can implicitly provide adjacency information through vertex indexing, clusters may be built speculatively from arbitrary workloads. To this end, a small primitive buffer is defined that can hold the N last assembled primitives and search for shared edges. Two primitives belong to the same cluster if their edges cannot be distinguished from the pixel shader's point of view (e.g., their vertex attributes present in the pixel shader input declaration are identical). A shading architecture is assumed that evaluates CPS quads in small tiles (at least 2×2 coarse pixels). As the next step, the hierarchical rasterization algorithm is modified so that it processes all triangles within the same cluster for each CPS quad before shading. This way the coverage of all triangles within the CPS quad is fully evaluated, and their shading attributes can be interpolated at any location. This brings us to our novel attribute interpolation method, which seeks to extend the concept of quad-fragment merging to CPS while reducing popping artifacts. For each covered sample, a trivial extension of the fragment merging method would find the triangle in the cluster that covers the coarse pixel center. If the coarse pixel center is not covered by any triangle (which can easily happen at partially covered quads), a canonical method may select a representative triangle from other coarse pixels ([Fatahalian et al. 2010]). This can lead to noticeable popping artifacts: if a different triangle covered the coarse sample location in the next frame, suddenly all samples within the coarse pixels would extrapolate a different triangle.

One embodiment of the invention considers all triangles within a cluster that have a coverage within the coarse pixel, not only the ones that actually cover the CPS samples. Without clustering, each triangle would get extrapolated at the same shading location, then distribute their shaded colors at the covered visibility samples. Now, the shading is computed exactly once in each coarse pixel, so instead of using a single triangle to shade all visibility samples, a weighted average of the vertex attributes extrapolated at the CPS location can be computed. The weights are proportional to the visibility samples a given triangle covers within a coarse pixel. As long as the cluster holds the same triangles, and their coverage changes continuously, this interpolation method yields continuously changing vertex attributes.

This method can be considered as an "MSAA resolve" were performed for the vertex attributes within the coarse pixels. Note that if the shader is approximately a linear function of shader attributes, then these techniques closely match the averaging of shader outputs (MSAA resolve for coarse pixels after shading).

A clustered CPS has been implemented inside the Rasty functional pipeline simulator. The implementation focuses only on the basic idea of the clustering and does not address the temporal artifacts introduced by the method.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
  pre-processing a graphics mesh by creating a tangent-plane parameterization of desired vertex attributes, wherein the tangent-plane parameterization includes:
    for each vertex of the graphics mesh,
      collecting neighboring triangles sharing the vertex, and
      iterating over the neighboring triangles and projecting them into a same tangent plane,
        wherein the projection includes obtaining first-order derivatives at the vertex using the neighboring triangles at the tangent plane, and wherein each first-order derivative is a texture derivative that is derived based on two scalar parameters of points on the tangent plane;
  performing rasterization of the graphics mesh in a rasterization stage of a graphics pipeline using the tangent-plane parameterization; and
  displaying resulting pixels from the rasterization to a display device.

2. The method as in claim 1 wherein pre-processing the graphics mesh further comprises:
  setting up and averaging linear attribute equations for each vertex.

3. The method as in claim 2 wherein performing rasterization further comprises:
  setting up plane equations in a vertex shader.

4. The method as in claim 3 wherein the plane equations comprise per-vertex tangent plane equations.

5. The method as in claim 4 wherein performing rasterization further comprises:
    making the plane equations visible to a pixel shader without interpolation.

6. The method as in claim 5 wherein performing rasterization further comprises:
    determining by the pixel shader modified texture derivatives based on a plurality of vertex tangent planes.

7. The method as in claim 6 wherein the pixel shader further interpolates results using barycentric coordinates.

8. A non-transitory machine-readable medium for coarse pixel shading (CPS) having program code stored thereon which, when executed by a machine, causes the machine to perform the operations of:
    pre-processing a graphics mesh by creating a tangent-plane parameterization of desired vertex attributes, wherein the tangent-plane parameterization includes:
        for each vertex of the graphics mesh,
            collecting neighboring triangles sharing the vertex, and
            iterating over the neighboring triangles and projecting them into a same tangent plane, wherein the projection includes obtaining first-order derivatives at the vertex using the neighboring triangles at the tangent plane, and wherein each first-order derivative is a texture derivative that is derived based on two scalar parameters of points on the tangent plane;
    performing rasterization of the graphics mesh in a rasterization stage of a graphics pipeline using the tangent-plane parameterization; and
    displaying resulting pixels from the rasterization to a display device.

9. The machine-readable medium as in claim 8 wherein pre-processing the graphics mesh further comprises:
    setting up and averaging linear attribute equations for each vertex.

10. The machine-readable medium as in claim 9 wherein performing rasterization further comprises:
    setting up plane equations in a vertex shader.

11. The machine-readable medium as in claim 10 wherein the plane equations comprise per-vertex tangent plane equations.

12. The machine-readable medium as in claim 11 wherein performing
    making the plane equations visible to a pixel shader without interpolation.

13. The machine-readable medium as in claim 12 wherein performing rasterization further comprises:
    determining by a pixel shader modified texture derivatives based on a plurality of vertex tangent planes.

14. The machine-readable medium as in claim 13 wherein the pixel shader further interpolates results using barycentric coordinates.

15. An apparatus for coarse pixel shading (CPS) comprising:
    preprocessing logic to pre-process a graphics mesh prior to rasterization by creating a tangent-plane parameterization of desired vertex attributes, wherein the tangent-plane parameterization includes:
        for each vertex of the graphics mesh,
            collecting neighboring triangles sharing the vertex, and
            iterating over the neighboring triangles and projecting them into a same tangent plane; wherein the projection includes obtaining first-order derivatives at the vertex using the neighboring triangles at the tangent plane, and wherein each first-order derivative is a texture derivative that is derived based on two scalar parameters of points on the tangent plane,
    a rasterization stage of a graphics pipeline to perform rasterization of the graphics mesh using the tangent-plane parameterization; and
    a display device to display resulting pixels from the rasterization.

16. The apparatus as in claim 15 wherein pre-processing the graphics mesh further comprises:
    setting up and averaging linear attribute equations for each vertex.

17. The apparatus as in claim 16 wherein the rasterization stage comprises:
    a vertex shader to set up plane equations.

18. The apparatus as in claim 17 wherein the plane equations comprise per-vertex tangent plane equations.

19. The apparatus as in claim 18 wherein the rasterization stage comprises:
    a geometry shader to make the plane equations visible to a pixel shader without interpolation.

20. The apparatus as in claim 19 wherein the rasterization stage further comprises:
    the pixel shader to determine modified texture derivatives based on a plurality of vertex tangent planes.

21. The apparatus as in claim 20 wherein the pixel shader further interpolates results using barycentric coordinates.

* * * * *